United States Patent Office 3,472,939
Patented Oct. 14, 1969

3,472,939
SYNERGISTIC BLENDS OF MICROBIOCIDAL
QUATERNARY AMMONIUM COMPOUNDS
Alfonso N. Petrocci, Glen Rock, Kenneth W. Prodo, Westfield, and Edward G. Shay, Belle Mead, N.J., and Reginald L. Wakeman, Philadelphia, Pa., assignors to Millmaster Onyx Corporation, New York, N.Y., a corporation of New York
No Drawing. Filed Dec. 6, 1967, Ser. No. 688,355
Int. Cl. A01n 9/20
U.S. Cl. 424—329                               2 Claims

ABSTRACT OF THE DISCLOSURE

A microbiocidal quaternary ammonium composition consisting essentially of a blend of two-alkyl dimethyl ethylbenzyl ammonium halides wherein the alkyl component in one of said halides has 12 carbon atoms and the alkyl component of the other has 14 carbon atoms, the proportion of one to the other being between 85/15 and 55/45 by weight. It has been discovered that when these specific quaternary compounds are used in these specific proportions, they have a synergistic effect on each other, and the product is far more microbiocidally active, especially in hard water, then when these compounds are used individually or in any other combination.

---

This invention relates to microbiocidal quaternary ammonium products, and it particularly relates to products of this type having a high degree of microbiocidal activity in hard water.

In accordance with the present invention, an unexpectedly high degree of microbiocidal activity in hard water is obtained with a blend or two quaternary ammonium chlorides or bromides where the quaternary ammonium cation of each quaternary component is alkyl dimethyl ethylbenzyl and wherein the alkyl group in one case is $C_{12}$ and in the other is $C_{14}$ these compounds being present only within the range of 85/15 to 55/45 of the $C_{12}$ compound relative to the $C_{14}$ compound. This does not exclude possible insignificant or trace amounts (of perhaps about 1.0 to 3.0% by weight) of other substances which would be present as impurities.

When the aforementioned proportions of $C_{12}$ and $C_{14}$ compounds are used, there is a completely unexpected synergism. However, if any significant amounts of any other alkyl groups in the said alkyl dimethyl ethylbenzyl ammonium compounds are present, this synergism is either partially or totally destroyed.

The term "hard water" is generally used to describe water having at least about 75 p.p.m. of calcium carbonates or equivalent salts.

The following examples illustrate the invention, without any intent, however to limit the invention except as claimed:

EXAMPLE 1

A quaternary was prepared in the presence of water, by the reaction of n-dodecyl dimethyl amine and ethylbenzyl chloride in the mol ratio of 1.00 to 0.98, by heating at ambient pressure at 80°–100° C. for from 1 to 2 hours, until the reaction was complete. Water was then added to bring the concentration of the dodecyl dimethyl ethyl benzyl ammonium chloride so formed to 50% by weight. The product was found to contain about 1% by weight of unquaternized amine, of which about half was present as the hydrochloride and half as the free amine.

In the same manner, the corresponding n-tetradecyl-, n-hexadecyl- and n-octadecyl dimethyl ethylbenzyl ammonium chlorides were prepared from the corresponding alkyl dimethyl amines and ethylbenzyl chloride, and finished at 50% concentration by weight as aqueous solution, and containing similar small amounts of unquaternized amine and its hydrochloride.

EXAMPLE 2

The same procedures were carried out as in Example 1, but substituting ethylbenzyl bromide for the corresponding chloride.

EXAMPLE 3

In the same manner as in Example 1, the respective alkyl dimethyl amines of that example were quaternized by reaction with unsubstituted benzyl chloride. The products were diluted to 50% by weight as aqueous solutions, and contained free amine and amine hydrochloride in the same small amount as before.

EXAMPLE 4

The same procedures were carried out as in Example 3, but using benzyl bromide instead of the corresponding chloride.

The quaternaries obtained in the above manner were tested for hard water tolerance by the standard method as given in the "Association Of Official Agricultural Chemists" Method: "Germicidal and Detergent Sanitizers, Official and Final Action" (10th edition, 1965), No. 5.023, page 87, against E. coli A.T.C.C. No. 11,229. This method determines the number of surviving organisms and is, therefore, a quite accurate test of microbiocidal activity.

The following tables show the results, in terms of parts per million water hardness tolerated by 200 parts per million of the quaternary on a 100% active basis:

TABLE 1

Products of Example 1, individually

Alkyl:          Hard water tolerance (p.p.m.)
$C_{12}$ ---------------------------------------- 400
$C_{14}$ ---------------------------------------- 700
$C_{16}$ ---------------------------------------- 400
$C_{18}$ ---------------------------------------- 300

Blends of the $C_{12}$, $C_{14}$ and $C_{16}$ alkyl derivatives were tested and the expected arithmetical averages, based on the values in Table 1, were compared with the values obtained experimentally. These comparisons are set forth in the following Table 2.

TABLE 2

Products of Example 1, Blended

| Percent by Wt. Alkyl | | | Hard Water Tolerance (p.p.m.) | |
|---|---|---|---|---|
| $C_{12}$ | $C_{14}$ | $C_{16}$ | Calculated | Determined |
| 85 | 15 | 0 | 445 | 1,000 |
| 80 | 20 | 0 | 460 | 1,000 |
| 75 | 25 | 0 | 475 | 1,000 |
| 70 | 30 | 0 | 490 | 1,050 |
| 65 | 35 | 0 | 505 | 1,100 |
| 60 | 40 | 0 | 520 | 1,000 |
| 55 | 45 | 0 | 535 | 1,000 |
| 62 | 33.2 | 4.8 | 500 | 900 |

TABLE 3

Products of Example 3, individually

Alkyl:          Hard water tolerance (p.p.m.)
$C_{12}$ ---------------------------------------- 100
$C_{14}$ ---------------------------------------- 700
$C_{16}$ ---------------------------------------- 400
$C_{18}$ ---------------------------------------- 100

TABLE 4

Products of Example 3, Blended

| Percent by Wt. Alkyl | | | | Hard Water Tolerance (p.p.m.) | |
|---|---|---|---|---|---|
| $C_{12}$ | $C_{14}$ | $C_{16}$ | $C_{18}$ | Calculated | Determined |
| 25 | 75 | 0 | 0 | 550 | 550 |
| 0 | 75 | 25 | 0 | 650 | 600 |
| 5 | 60 | 30 | 5 | 550 | 550 |

The calculated tolerances in Tables 2 and 4 are the arithmetic averages, as the sum of the products of the fractional part times the experimental hard water tolerance of the respective cuts.

The first two items of Table 4 are representative mixtures of the peak $C_{14}$ (unsubstituted) benzyl quaternary with, in each case, the respective adjacent member. The third item is a composition containing a commercially available mixture of n-alkyl dimethyl amines.

The hard water tolerance tests as conducted here utilize a series of waters with hardness in increments of 50. This is the general test procedure.

Although, as indicated above, the unexpected jump in activity when using the specific proportions of $C_{12}$ and $C_{14}$ alkyls is confined only to the ethyl benzyl quaternaries, these products may be effectively blended with the $C_{14}$ quaternaries having an unsubstituted benzyl group since these latter compounds have a high hard water tolerance of 700 and are less expensive than the corresponding ethyl benzyl compounds.

EXAMPLE 5

The ethyl benzyl quaternary mixture, the fifth item in Table 2, containing 65% of the dodecyl and 35% of the tetradecyl analogs, was blended with the tetradecyl dimethyl benzyl ammonium chloride of Example 3, in the proportion of 1:1 by weight.

The hard water tolerance was computed arithmetically to be 900, and it was found experimentally to be 900.

The corresponding quaternary ammonium bromides, in each case, gave similar results, when tested for hard water tolerance on an equivalent weight basis; that is, allowing for the difference in equivalent weight of the respective chlorides and bromides.

The invention claimed is:

1. A microbiocidal composition consisting essentially of a blend of dodecyl dimethyl ethylbenzyl ammonium halide and tetradecyl dimethyl ethylbenzyl ammonium halide wherein each halide is chloride or bromide, the proportion of the dodecyl compound to the tetradecyl compound being between about 85/15 and 55/45 by weight.

2. An aqueous microbiocidal solution wherein the water is hard water and wherein there is present a microbiocidally effective amount of a composition consisting essentially of a blend of dodecyl dimethyl ethylbenzyl ammonium halide and tetradecyl dimethyl ethylbenzyl ammonium halide wherein each halide is chloride or bromide, the proportion of the dodecyl compound to the tetradecyl compound being between about 85/15 and 55/45 by weight.

References Cited

UNITED STATES PATENTS

| 2,692,231 | 10/1954 | Stayner et al. | 210—23 |
|---|---|---|---|
| 3,140,976 | 7/1964 | Berenschot et al. | 167—22 |
| 3,247,058 | 4/1966 | Hyman | 167—38.6 |
| 3,285,959 | 11/1966 | McFarlane | 260—567.6 |
| 3,349,033 | 10/1967 | Zuccarelli | 252—8.75 |
| 2,700,683 | 1/1955 | Tesoro et al. | 424—329 |

ALBERT T. MEYERS, Primary Examiner

FREDERICK E. WADDELL, Assistant Examiner